United States Patent
Zutz

[19]

[11] Patent Number: 6,053,506
[45] Date of Patent: Apr. 25, 2000

[54] SLIDE RING SEAL ASSEMBLY INCLUDING A SUPPORTING RING HAVING AN EMBEDDED REINFORCING BODY

[75] Inventor: Hans-Henning Zutz, Wermelskirchen, Germany

[73] Assignee: AE Goetze GmbH, Burscheid, Germany

[21] Appl. No.: 08/937,339

[22] Filed: Aug. 22, 1997

[30] Foreign Application Priority Data

Sep. 19, 1996 [DE] Germany .......................... 196 38 321

[51] Int. Cl.⁷ .................................................. F16J 15/16
[52] U.S. Cl. ........................ 277/651; 277/380; 277/381; 277/575
[58] Field of Search ..................... 277/390, 382, 277/381, 380, 377, 370, 575, 651, 503

[56] References Cited

U.S. PATENT DOCUMENTS

| | | | |
|---|---|---|---|
| 2,279,699 | 4/1942 | Friskney | 286/7 |
| 5,199,719 | 4/1993 | Heinrich et al. | 277/40 |

FOREIGN PATENT DOCUMENTS

| | | |
|---|---|---|
| 69 04 242 | 2/1969 | Germany . |
| 33 18 078 | 11/1984 | Germany . |
| 195 05 853 | 8/1996 | Germany . |

OTHER PUBLICATIONS

Erhard et al, "Maschinenelemente aus thermoplastischen Kunststoffen, Grundlagen und Verbindungselemente", Feb. 1974, pp. 20–23.

*Primary Examiner*—Anthony Knight
*Assistant Examiner*—Lewis Nguyen
*Attorney, Agent, or Firm*—Venable; Gabor J. Kelemen

[57] ABSTRACT

A slide ring seal assembly includes a slide ring having a radial slide face and a circumferential conical surface; a support ring, made of an elastic material, surrounding the slide ring and having a circumferential conical surface; an annular elastic rolling body disposed between the slide ring and the support ring and being in engagement with the circumferential conical surfaces thereof; and an annular reinforcing body embedded in the support ring and having a plurality of radially, axially and circumferentially extending channels distributed over the circumference of the reinforcing body.

4 Claims, 1 Drawing Sheet

SLIDE RING SEAL ASSEMBLY INCLUDING A SUPPORTING RING HAVING AN EMBEDDED REINFORCING BODY

BACKGROUND OF THE INVENTION

This invention relates to a slide ring seal assembly, particularly a seal for a running gear and is of the type which has a slide ring and a support ring, both provided with conical surfaces which serve as rolling faces for an elastic rolling body disposed between the slide ring and the support ring. The support ring is made of an elastic material and includes an embedded, generally cylindrical (annular) reinforcing body.

Conventional slide ring seal assemblies of the above-outlined type are generally used in pairs, and the two geometrically identical slide rings of a pair are axially pressed to one another by the expansion force (restoring force) of the compressed elastic rolling bodies to obtain the required sealing effect.

For supporting the elastic rolling body, conically extending faces are required both on the slide ring and the machine component in which the slide ring seal assembly is inserted. The inclinations of the conical surfaces are unlike so that with an increasing axial displacement of the slide ring, the cross-sectional deformation and diametrical change of the elastic rolling body increases. The cross-sectional deformation of the rolling body as well as its diametrical change are critical factors for pressing together the slide faces of the two slide rings of the slide ring seal assembly pair. The rolling body furthermore assumes a sealing function between the axially movably supported slide ring and the machine component, and also provides for the transmission of torque. To ensure that the rolling body may perform its functions in a satisfactory manner, it is required to accurately dimension and finish the conical surfaces. To avoid a relatively expensive machining of the machine component to provide it with the conical surface, separate support rings have been used which may be inserted into a cylindrical well of the machine component. Thus, German Gebrauchsmuster (Utility Model) No. 6,904,242 discloses a reinforcing body which is embedded into the elastic material of the support ring and which is a deep-drawn sheet metal component.

In some applications it is necessary to shroud the reinforcing body to prevent corrosion thereof. The disadvantage of known reinforcing bodies of this type resides in that the deep-drawn sheet metal parts have to be sandblasted and have to be provided with chemical adhesives to ensure a bond between the metal component and the elastomer material of the support ring. In case of an insufficient bond the elastomer material separates from the metal reinforcing body, whereby corrosive substances may gain access to the metal component to such an extent that the entire metal/elastomer bond is destroyed, leading to a breakdown of the slide ring assembly.

SUMMARY OF THE INVENTION

It is an object of the invention to provide an improved slide ring seal assembly in which a highly satisfactory attachment between the reinforcing body and the support ring is ensured without the use of a chemical bond.

This object and others to become apparent as the specification progresses, are accomplished by the invention, according to which, briefly stated, the slide ring seal assembly includes a slide ring having a radial slide face and a circumferential conical surface; a support ring, made of an elastic material, surrounding the slide ring and having a circumferential conical surface; an annular elastic rolling body disposed between the slide ring and the support ring and being in engagement with the circumferential conical surfaces thereof; and an annular reinforcing body embedded in the support ring and having a plurality of radially, axially and circumferentially extending channels distributed over the circumference of the reinforcing body.

The channels in the reinforcing body provide that during forming (for example, by injection molding) the elastomer support ring about the reinforcing body, the elastomer material penetrates into the channels, whereby the reinforcing body is circumferentially securely anchored to the support ring.

Making the support ring in an injection molding process is also advantageous in that it involves reduced manufacturing costs compared to processes making a deep-drawn reinforcing body. According to an advantageous feature of the invention, the reinforcing body is made of a polyamide, and thus the risks of corrosion are even more securely avoided. The channels extending in three planes (that is, in an axial, radial and circumferential direction) result in a form-fitting anchoring of the elastomer with the polyamide so that chemical adhesives (bonding agents) are not needed.

DESCRIPTION OF THE PREFERRED EMBODIMENT

Figure 1:
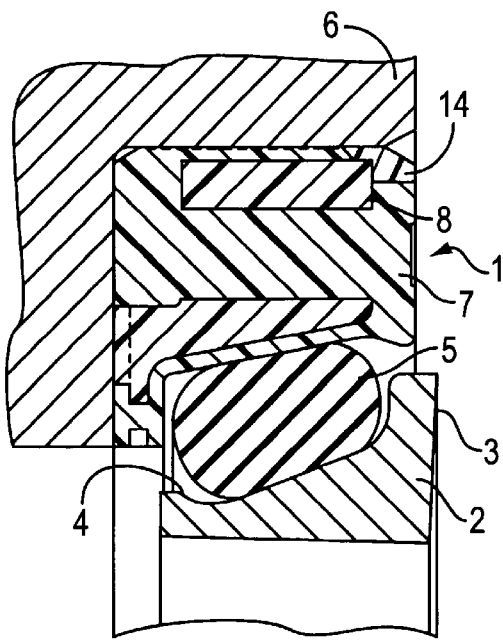
FIG. 1 is an axial sectional view of a slide ring seal assembly according to the invention.

FIG. 1 illustrates a slide ring seal assembly 1 which, in practice, is used in pair, that is, another assembly which may be identical to the assembly 1 is, in a mirror image arrangement situated at the right of the assembly 1. The assembly 1 includes a slide ring 2 which has a generally radial, sliding engagement face 3 and an outer conical circumference surface 4 for receiving an elastic rolling body 5. A support ring 7, also forming part of the assembly 1 and being inserted into a well of a machine component 6 is made of an elastomer material in which an annular reinforcing body 8 made of synthetic material is embedded.

Figure 2:
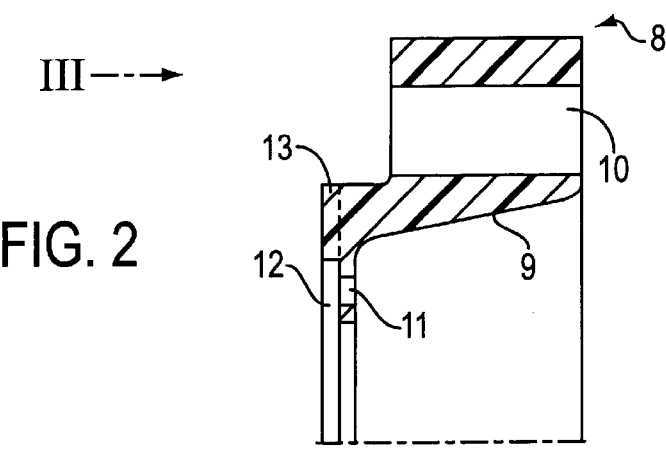
FIG. 2 is an axial sectional view of further details of a component forming part of the structure shown in FIG. 1.

Turning to FIG. 2, the reinforcing body 8 which has an inner conical surface 9, is made by injection molding and its material is, for example, fiber glass-reinforced polyamide.

Figure 3:
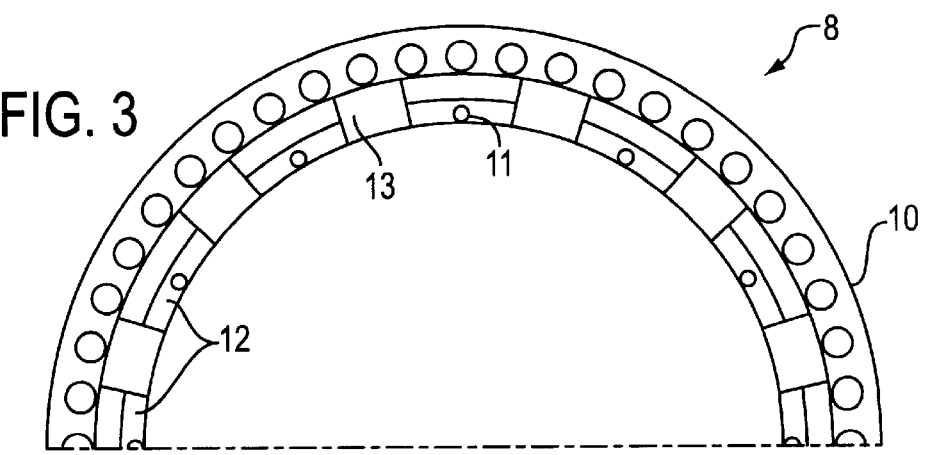
FIG. 3 is a front elevational view of the component shown in FIG. 2, seen in the direction of the arrow III.

Also referring to FIG. 3, the reinforcing body 8 has a plurality of channels which are formed by bores 10, 11 extending axially and are formed by recesses 12 and 13 extending in the circumferential and radial direction, respectively. As the support ring 7 is made (for example, by injection molding) about the reinforcing body 8, the elastomer material of the support ring flows through the channels 10–13 of the reinforcing body 8 and in this manner the support ring 7 is anchored with the reinforcing body 8 such that in an axial, radial and circumferential direction a highly satisfactory rigid coupling is provided and therefore a chemical bonding agent for ensuring such immobilization is not needed. To prevent the reinforcing body 8 from floating away during the injection of the elastomer material in the mold, suitable centering and holding devices are provided (not shown) which engage a radial face 14 of the reinforcing body 8.

It will be understood that the above description of the present invention is susceptible to various modifications, changes and adaptations, and the same are intended to be comprehended within the meaning and range of equivalents of the appended claims.

What is claimed is:

1. A slide ring seal assembly comprising
   (a) a slide ring having a generally radial slide face and a circumferential conical surface;
   (b) a support ring surrounding said slide ring and being of an elastic material; said support ring having a circumferential conical surface;
   (c) an annular elastic rolling body disposed between said slide ring and said support ring and being in engagement with said circumferential conical surfaces thereof; and
   (d) an annular, fiber glass-reinforced polyamide reinforcing body embedded in said support ring and having a plurality of radially and circumferentially extending recesses and axially extending channels distributed over a circumference of said reinforcing body; said recesses being connected with one another, and said elastic material of said support ring extending into said recesses and channels.

2. The slide ring seal assembly as defined in claim 1, wherein the axially extending channels are bore holes.

3. The slide ring seal assembly as defined in claim 1, wherein said reinforcing body has a circumferential conical surface.

4. The slide ring seal assembly as defined in claim 3, wherein said circumferential conical surface of said reinforcing body extends substantially parallel to said circumferential conical surface of said support ring.

* * * * *